Feb. 26, 1952 W. O. VEDDER 2,587,416
DUST COLLECTOR
Filed Feb. 8, 1949 6 Sheets-Sheet 1
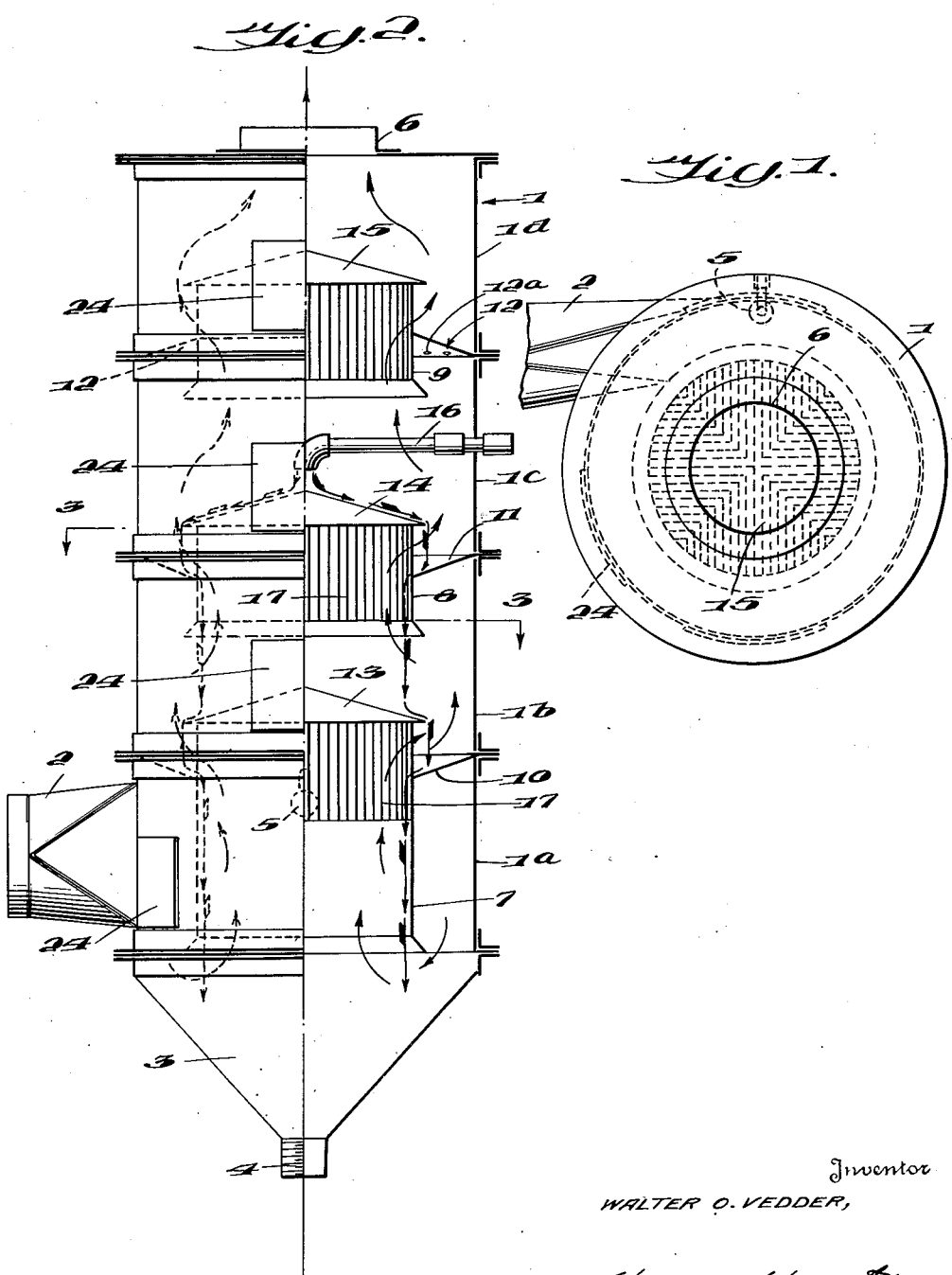
Inventor
WALTER O. VEDDER,
By Hall + Houghton,
Attorneys Feb. 26, 1952   W. O. VEDDER   2,587,416
DUST COLLECTOR Filed Feb. 8, 1949   6 Sheets-Sheet 2

Inventor
WALTER O. VEDDER,
By Hall + Houghton,
Attorney

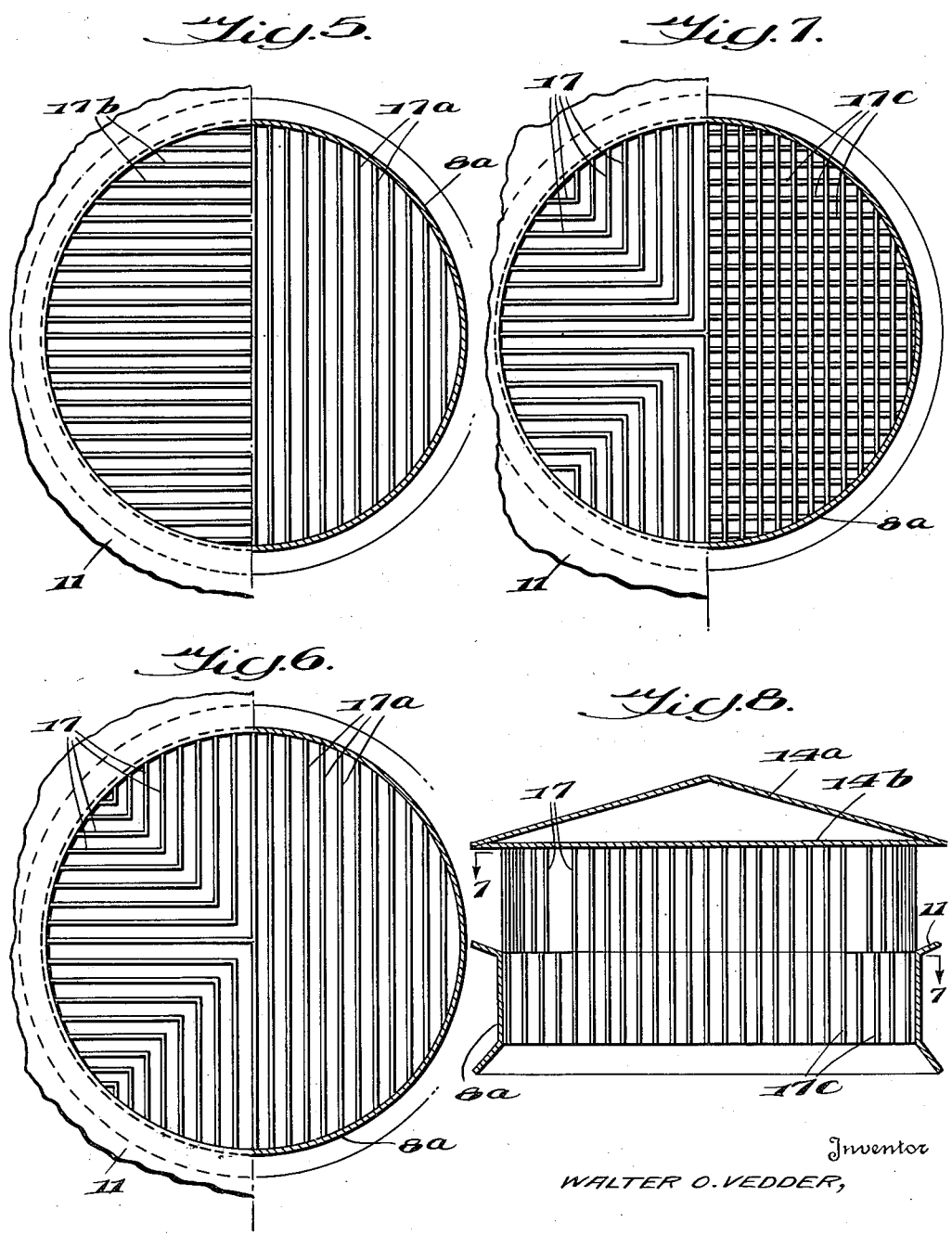

Feb. 26, 1952 W. O. VEDDER 2,587,416
DUST COLLECTOR
Filed Feb. 8, 1949 6 Sheets-Sheet 4
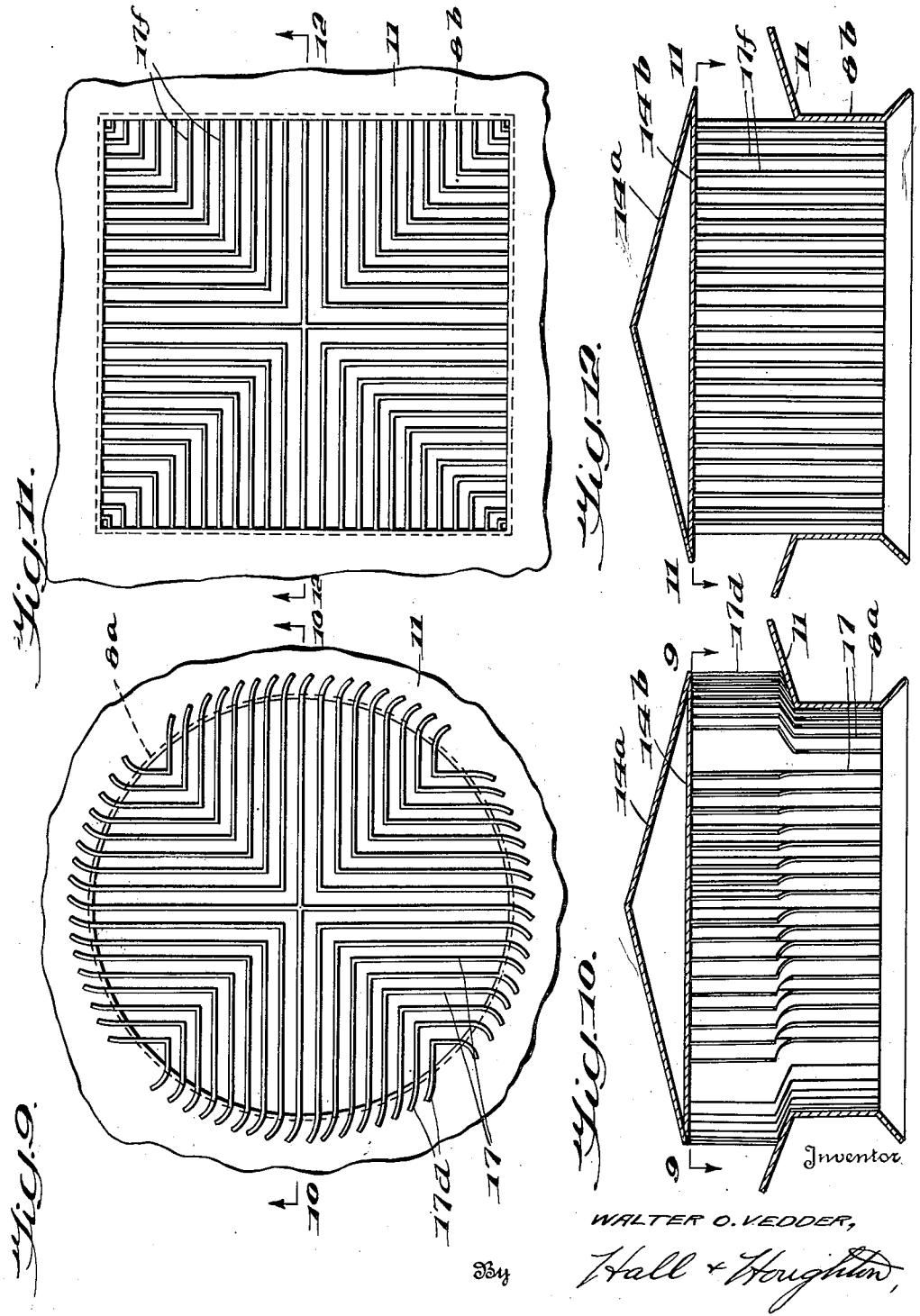
Inventor
WALTER O. VEDDER,
By Hall + Houghton,
Attorneys Feb. 26, 1952   W. O. VEDDER   2,587,416
DUST COLLECTOR
Filed Feb. 8, 1949   6 Sheets-Sheet 5
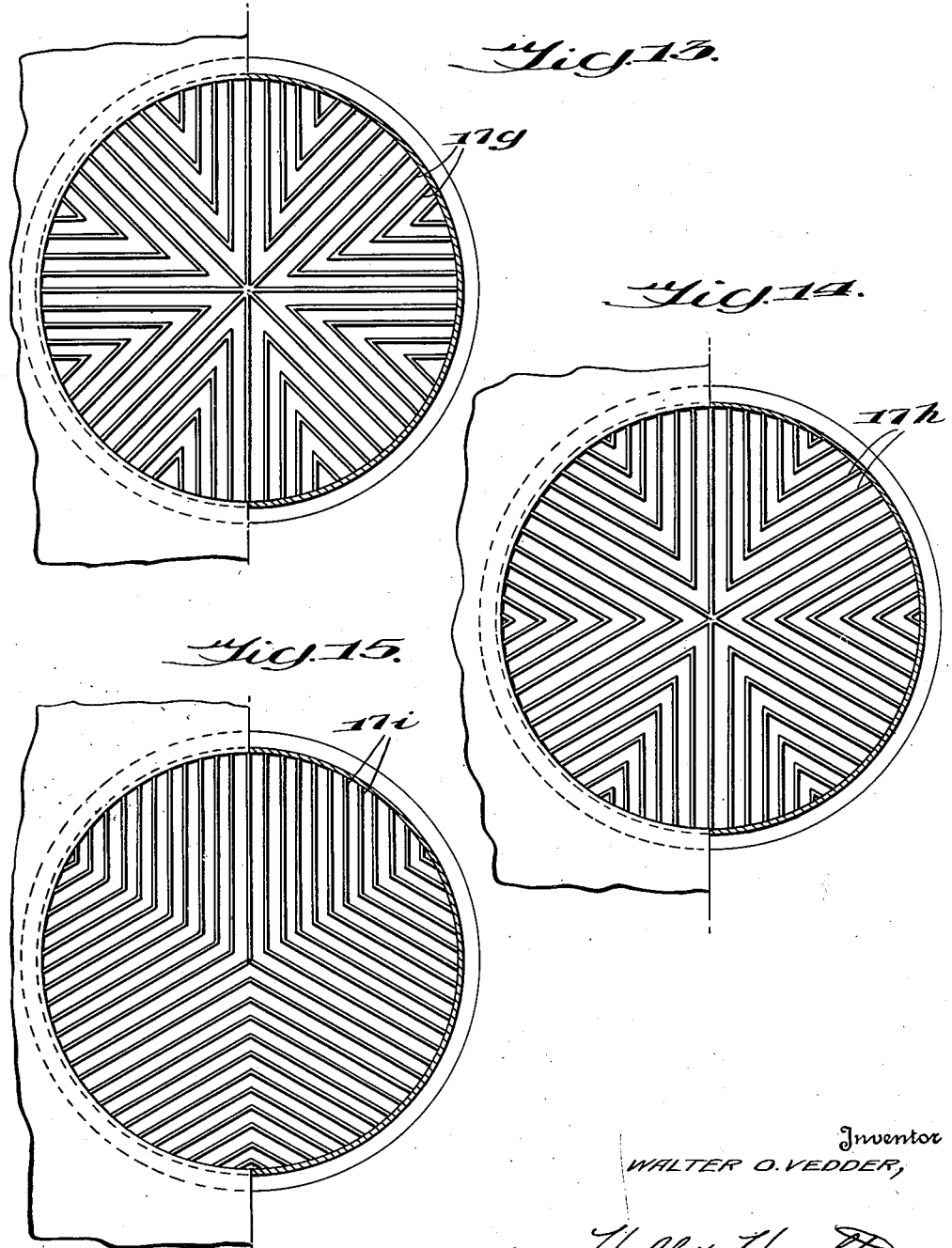
Inventor
WALTER O. VEDDER,
By Hall + Haughton
ATTORNEY

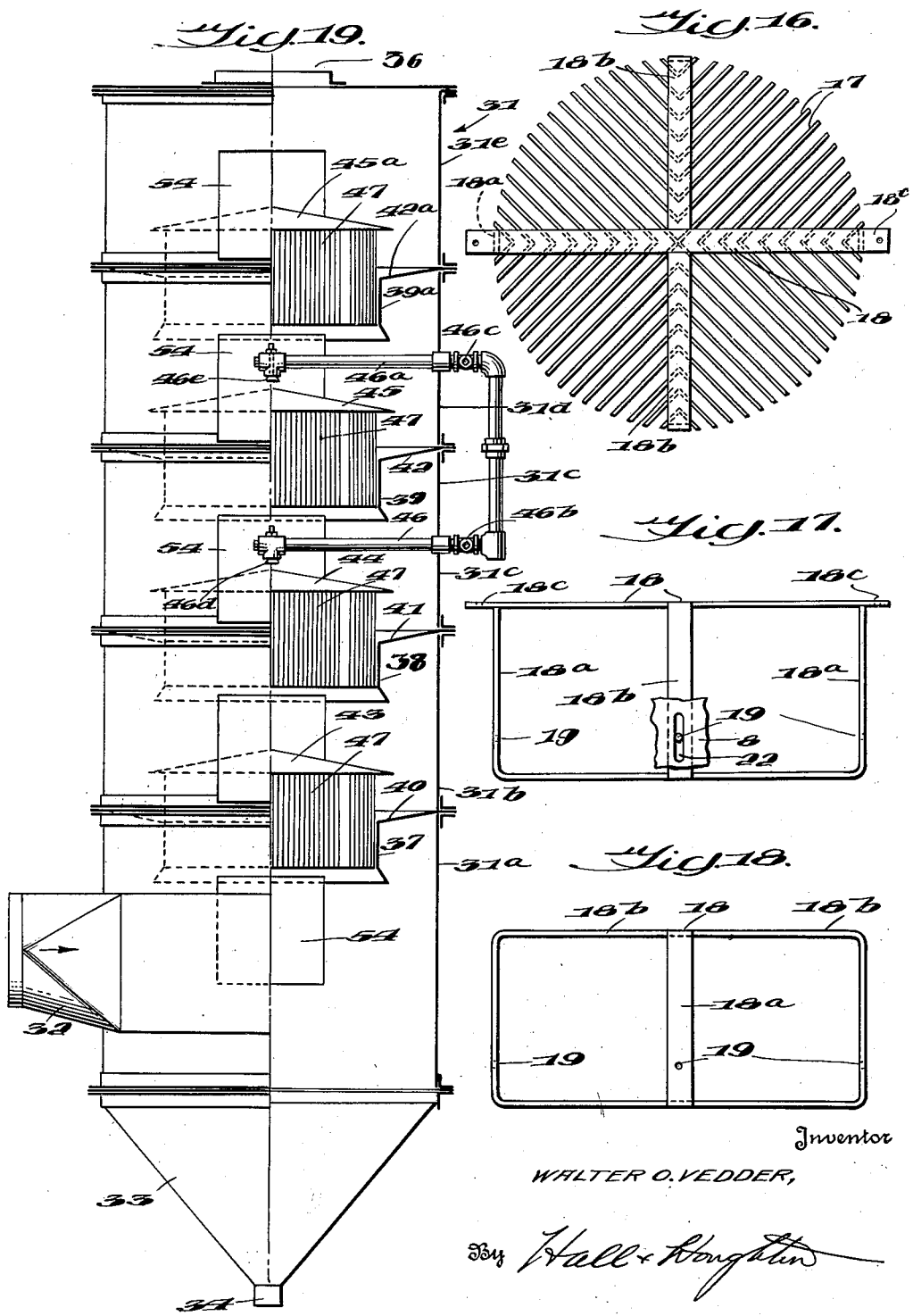

Patented Feb. 26, 1952

2,587,416

UNITED STATES PATENT OFFICE 2,587,416

DUST COLLECTOR

Walter O. Vedder, Hagerstown, Md., assignor to Pangborn Corporation, Hagerstown, Md., a corporation of Maryland Application February 8, 1949, Serial No. 75,227

11 Claims. (Cl. 183—21)

This invention relates to dust collectors and aims to provide a wet dust collector of high efficiency and simple and compact construction.

Among the objects of the invention, severally and interdependently, are the following: To provide in such a collector novel means for impinging relatively narrow air streams on greatly extended areas of wetted surface. To provide therein novel means for causing a sharp change in direction and impingement on wetted surfaces of the gas stream to be cleaned. To provide therein effective means for adjusting the impact velocity of laden gases against wetted surfaces. To provide therein means to increase the impact velocity in successive wet separating stages to increase the effectiveness of the separation on the finer dust particles. To provide a structure for obtaining a high degree of wetted surface impingement together with change in direction of relatively narrow air streams with a minimum of resistance to air flow. To provide a combination in a multi-stage wet separator of a preliminary wetting and separating section with successive high area wet impingement sections. To provide an efficient wet separator having low-resistance linear airflow. To provide a wet separator having low-resistance linear airflow through a plurality of wetting sections and through a liquid eliminating section.

Further objects and advantages of the invention will be apparent from the following description of exemplary embodiments thereof.

The invention comprises the novel features and combinations hereinafter described and claimed.

In the accompanying drawings:

Figs. 1 and 2 are a plan view and a vertical elevation partly in section of one embodiment of the invention.

Figs. 5, 6 and 7 are views of modified arrangements similar to Fig. 3, but taken on two vertically spaced planes as from the line 7—7 of Fig. 8, looking in the direction of the arrows.

Fig. 8 is a vertical section partly in elevation of the embodiment illustrated in Fig. 7.

Figure 3:
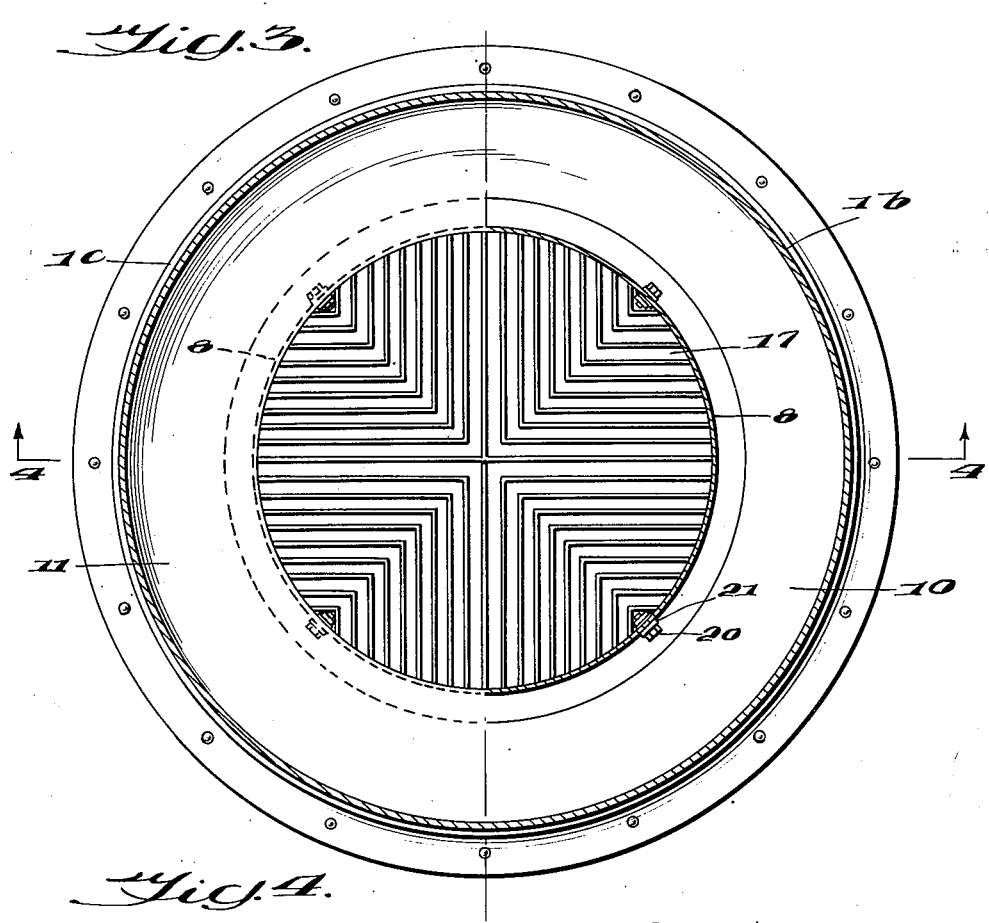
Fig. 3 is a horizontal cross section taken on the line 3—3 of Fig. 2 looking in the direction indicated by the arrows.
Figure 4:
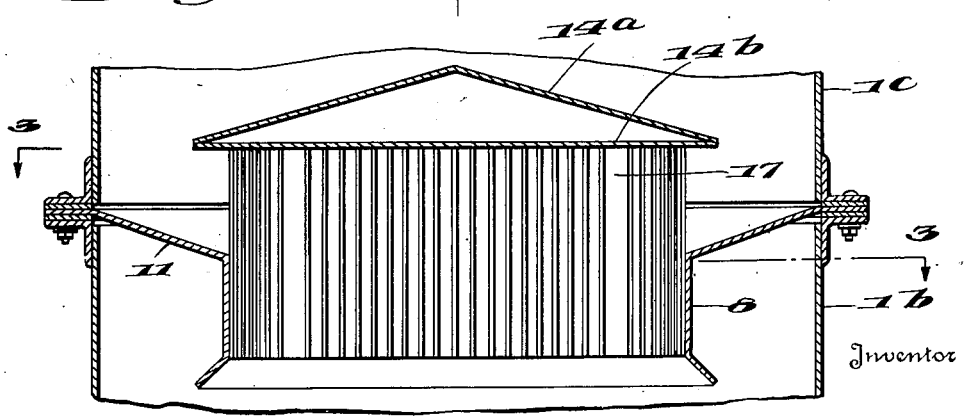
Fig. 4 is an enlarged vertical section partly in elevation taken on the line 4—4 of Fig. 3, looking in the direction of the arrows.

Figs. 9 and 10 are horizontal and vertical sections of a further modification, Fig. 9 being a horizontal section taken on the line 9—9 of Fig. 10 in the direction indicated by the arrows and Fig. 10 being a vertical section partly in elevation taken on the line 10—10 of Fig. 9 looking in the direction of the arrows.

Figs. 11 and 12 are horizontal and vertical sections of still a further modification, Fig. 11 being a horizontal section taken on the plane 11—11 of Fig. 12 looking in the direction indicated by the arrows, and Fig. 12 being a vertical section taken on the line 12—12 of Fig. 11 looking in the direction of the arrows.

Figs. 13, 14 and 15 are horizontal sections through modified constructions taken on planes corresponding to the line 7—7 of Fig. 8, looking in the direction of the arrows.

Fig. 16 is a plan view of one form of vane assembly mounting, and Figs. 17 and 18 are front and side elevations thereof with the vanes omitted, a portion of the uptake tube 8 (Fig. 2) being shown in Fig. 17.

Fig. 19 is a view corresponding to Fig. 2, of a modified arrangement.

In the embodiment of the invention shown in Figs. 1 through 4 the apparatus comprises a vertical casing or column 1 made up of several sections or stages 1a, 1b, 1c, 1d respectively. The section 1a, as best shown in Fig. 2, is preferably provided with a tangential gas inlet 2 and a hopper bottom 3 having a sludge outlet 4. This section may be provided with a water inlet or spray nozzle 5 (Figs. 1 and 2) aligned with the tangential gas inlet for spraying liquid into the entering gas and onto the walls of the section 1a.

The final section 1d in the form shown is provided centrally of its top wall with a gas outlet 6 which may lead to a suction fan if desired.

The several sections or compartments 1b, 1c and 1d are each provided with uptake ducts 7, 8, 9, and with partition means 10, 11, 12 closing the space between the associated uptake duct and the casings 1.

As shown each of the uptake ducts 7, 8, 9 is preferably provided with a flared or skirted lower entrance portion aiding in smoothly conducting thereinto the entering gas stream.

Each of the sections 1b, 1c, 1d is further provided with a cap 13, 14, 15 overlying its associated duct 7, 8, 9 and spaced therefrom and from the overlying duct 8, 9 and 6. As shown each cap 13, 14, 15 preferably has a conical top wall and a flat lower wall as exemplified at 14a and 14b in each of Figs. 4, 8, 10 and 12, and the caps as there shown are preferably somewhat larger than the underlying ducts to overhang the same as shown.

In the intermediate or wet vane sections 1b, 1c the bottoms 10, 11 are dished or sloped to conduct liquid falling thereon inwardly to the ducts 7, 8 to be sub-divided and spread across the surfaces therein as hereinafter more fully described. The uppermost of the intermediate or wet vane sections 1c is provided with a liquid inlet pipe 16 which in the form shown discharges centrally above the cap or baffle 14.

In the eliminator section 1d the partition means 12 (Fig. 2) is of inverted dished form, or sloped away from the uptake duct 9, and is provided adjacent the casing wall 1d with perforations 12a (Fig. 2) or other means for delivering water collected in the eliminator section to the underlying wet vane section 1c.

Each of the sections 1b, 1c, 1d in the form of Figs. 1 to 4 is provided with vane means 17 extending laterally under its associated cap 13, 14, 15, and extending longitudinally within the associated uptake duct 7, 8, 9. The vane means 17, as best shown in Fig. 3, comprises rectifying vanes (i. e., means for eliminating, suppressing or inhibiting bodily rotation of the gas about the separator axis) extending longitudinally for a substantial distance within the uptake duct and dividing or splitting the upflowing gases into a multiplicity of narrow streams confined between the wetted walls of the vanes and directed vertically toward the underlying surface of the associated cap 13, 14, 15. In the space between the cap and the top of the associated uptake tube 7, 8, 9, the vane means provides laterally directed outlets. Thus the subdivided narrow streams of gas pass upwardly in close contact with the wetted vanes and are forced to change direction under the associated cap and pass laterally outwardly under the perimetral edges of the cap. The water or other liquid supplied through the inlet pipe 16 cascades sheetwise around the perimetral edges of the caps 14 and 13 forming a water screen, curtain or sheet, through which the gases discharged from each vane section pass in their lateral flow toward the surrounding casing wall 1. The airflow carries with it portions of the descending water thoroughly wetting all the internal walls of the collector including the wall surfaces of the multiplicity of passages provided by the wet vane means 17. The water flowing inwardly over the dished bottoms 10, 11 of the wet vane sections passes into the uptake ducts 7, 8 and down the wall portions thereof, and flows downwardly as a generally perimetral sheet or screen from the lower end of the uptake duct, as indicated by the feathered arrows in Fig. 2. Thus the air entering these uptake ducts has to pass through this water screen on its way to the vane section and picks up therefrom water which is carried back to and distributed over the vane section.

In the form of Figs. 1 to 4 the vane section 17 throughout its height is perimetrally equal in extent to the associated uptake duct 7, 8, 9. In this form also the vane means 17 are grouped in four quadrants (see Fig. 3) arranged to discharge the narrow streams laterally in generally parallel groups. Thus a nozzle-wise section is effected which maintains a high discharge velocity. With this arrangement the discharged streams may pass at relatively high velocity and relatively freely into impinging relation with the walls of casing 1 and the spaces adjacent these walls between the discharge receiving areas or discharge zones allow the gases to expand and flow laterally and upwardly with a minimum reduction in the velocity of the vane discharged gases.

The caps 13, 14 and 15 and their associated vane assemblies 17 are preferably vertically adjustable within their associated upflow ducts 7, 8, and 9, such adjustments being afforded in any suitable way. For clarity, the details of the vane mounting and adjusting means are omitted in Figs. 1, 2 and 4 to 15, and such means is but generally indicated at 20, in Fig. 3. Figs. 16 to 18, however, show in detail an exemplary construction of movable vane assembly in accordance with this invention. As in the arrangement there shown, the vane or baffle members 17, etc., may be assembled in vane or baffle cages or frames, shown as made up of a top frame member 18, a depending U-shaped frame member 18a, and two laterally open U-shaped frame members 18b. In Fig. 16, for purposes of illustration, the vanes 17 are arranged as in Figs. 3 and 4. Their tops, at their angle corners, are notched to position the top edges of the vanes flush with the tops of the frame means 18, 18b, and the bottom edges of the vanes 17 may be similarly notched for assembly with the lower portions of frame element 18a, 18b, if desired. The vane elements 17 and the frame elements 18, 18a, 18b may be secured together in any suitable way, as by tack-welding at their junction points, as shown. The assembly is provided with means for securing to it the cap 13, 14, or 15, exemplified by the tabs or ears 18c at the ends of the member 18.

The provision for vertical adjustment in the form shown, is afforded by providing the frame members 18a, 18b with tapped holes 19. The cap screws 20, Fig. 3, which may be provided with plate washers 21 may extend through vertical slots 22 cut in the uptake members 7, 8, 9 and into engagement with these holes 19, as indicated in Figs. 17 and 18.

By virtue of their adjustability the vane sections may be raised or lowered to decrease or increase the impact velocity against the internal wetted surfaces of the casing 1. By virtue of this feature it is also possible to adjustably increase the impact velocity in successive wet sections to increase the effectiveness of impact on the finer dust particles carried through to the upper wet vane sections. To suit specific requirements the spacing between the vanes of the vane sections 17 may also be increased or decreased.

Any or all of the compartments 1a, 1b, 1c, 1d may be provided with one or more windows 24 to enable observation of the operation of the device in various conditions of adjustment.

It will be seen that in the operation of this form of the invention the dust-laden air or gas entering the inlet tube is subjected to preliminary wetting and preliminary separation of the larger dust particles before entering the first uptake tube 7. When the preliminary separation is accomplished centrifugally as in the form shown, the air entering the uptake tube 7 is in whirling motion. The rectifying vanes 17 associated with the tube 7 eliminate the whirling motion and cause the air to pass vertically upward in narrow streams in contact with the wet vane surfaces. The air impinging on the underside of the cap 13 is forced to undergo a change in direction thus throwing out moisture and dust content against the cap 13 to descend by gravity along the vanes 17. The air discharging perimetrally under the edges of cap 13 is channelled nozzlewise and thoroughly rewetted by the water cascading over the edges of this cap and is projected forcefully against the casing wall 1b. This impingement and the ensuing change in direction of the air cause more dust and water to be deposited on the wall 1b. The air then passes through the descending rain of water falling from the uptake tube 8 and is thoroughly rewetted as it enters this second wet vane section for further impingement cleaning. After passing through the desired number of wet vane sections, two of which are shown in the embodiment of Figs. 1 to 4, the well-washed air, with such residual moisture as is entrained therein, passes into the uptake duct 9 where its change in direction under the cap 15 deposits much of its moisture, and laterally into the discharge section 1d. Here the impact with the wall 1d delivers the air of virtually all of the entrained water droplets and the cleaned air unladen of its entrained water is delivered through the outlet 6. The water deposited in the dewatering section 1d, is conducted to the underlying section 1c without passing through the duct 9, so relatively little rain occurs at the entrance to this duct.

Figs. 5 to 15 illustrate some of the modified forms of vane means which may be employed within the broader aspects of the invention.

In Fig. 5 the lower section of the vane means is made up of parallel walls 17a extending across the upflow duct 8a in one direction and the upper section thereof is made up of parallel walls 17b extending across the space under the cap in a transverse direction. By this arrangement the air upflowing in the section 17a is prevented from moving transversely until it enters the upper section 17b and portions of each of the streams rising through section 17a are then divided and passed laterally in two directions between vanes 17b.

In the form of Fig. 6 the lower section is made up of vanes 17a similar to those in Fig. 5 while the upper section is made up of vanes 17 similar to those in Fig. 3.

In the form of Figs. 7 and 8 the lower section is made up of vanes 17c crossing each other grillewise and dividing the upflowing air into separately channeled narrow streams each surrounded by four wetted walls, while the upper section is made up of vanes 17 similar to those in Fig. 3 for discharging in four group directions. In the form of Figs. 9 and 10 the vanes 17 are generally similar to those of Fig. 3, and discharge in four group directions, but their tips are provided with laterally offset portions 17d tending to produce a local change in direction closely adjacent the overlying cap. This form preserves the advantage of the multiplicity of wetted vane surfaces extending throughout the area under the cap and within the uptaking tube 8a, and the advantage of change of direction within the vane assembly, while providing a whirling action of the discharged gas when this is desired.

The uptake duct and vane assemblies as well as the overlying caps are preferably given some regular geometric shape, which shape is preferably similar to the cross-section of the casing. As exemplifying any regular geometric shape there are shown in Figs. 1 to 10 devices of circular cross-section and in Figs. 11 and 12 a device of square cross-section. From an inspection of Figs. 11 and 12 it will be observed that the vane means 17f in general is similar to that shown in Fig. 3 and that, by reason of the fact that the vane assembly discharges the stream of gas in four parallel groups, substantially equal distances are provided between the discharge ends of the vanes and the surrounding casing walls 8b, while the corners of the casing remain available to receive the air impacted with the casing walls and changed in direction thereby, for conducting the same upwardly and inwardly toward the next uptake duct, without impeding the flow of the discharged gases toward the casing walls. That this same advantage of parallel group discharges is also obtainable with other than two- and four-group arrangements, is exemplified in Figs. 13, 14 and 15, in which the vanes 17g, 17h, and 17i are arranged for eight-, six- and three-direction discharges, respectively.

Thus in each of the forms disclosed the dust-laden air is subjected to a very great area of wetted surface for impingement, while the resistance to airflow is maintained at a minimum because of the rectilinear form of flow and the substantial elimination of whirling action and gas expansion in the vane sections.

As a general rule the several vane sections of a given installation may be similar in construction although it is contemplated that the different stages may be provided with different specific forms of vane means best suited to the separation to be effected at the given stage as will be apparent from the various forms exemplified herein. Furthermore while I prefer to supply liquid through the inlet 16 and employ a maximum of countercurrent flow of liquid and air, the invention may be adapted for parallel flow in which the water is admitted to the entering air stream and carried thereby through the several stages. Any desired number of wet stages and eliminator sections may be employed, and in the broader aspects of the invention any desired form of preliminary wetting and separating means may be used.

For exemplifying the foregoing, reference may be had to the embodiment shown in Fig. 19. In this embodiment the casing 31 comprises five sections or stages 31a to 31e. The lowermost stage 31a is a preliminary centrifugal separating stage, having a tangential inlet 32, a hopper bottom 33 and a sludge outlet 34, and the final stage 31e has a gas outlet 36.

The stages in this form have four inter-communicating ducts 37, 38, 39, 39a, each substantially similar to the duct 8 in the form of Fig. 1, and the spaces between the tops of these ducts and the surrounding casing walls are closed by partition means 40, 41, 42, 42a, shown as of dished form similar to the partitions 10, 11 in Fig. 1. The lowermost duct 37, in this embodiment, terminates above the level of the tangential inlet 32, and it and its contained vanes shower descending liquid through the greater part of the height of the centrifugal separating zone. The centrifugal action in this zone disburses the descending liquid which thus effectively wets the gases undergoing centrifugal separation.

In the form of Fig. 19, the caps 43, 44, 45, 45a and the vane means 47 may be of any of the forms previously exemplified, and may be supported in the manners hereinbefore described or in any other suitable way.

In this embodiment a plurality of liquid inlets 46, 46a are provided, associated with superposed stages of the separator, herein the stages 31c and 31d. These liquid inlets are provided with control valves 46b, 46c, so that any one or more of them may be employed, and in the form shown are also provided with adjustable spray cones or nozzles 46d, 46e. By employing only the lower of the liquid inlets 46, this arrangement may be operated with two washing stages 31b, 31c, in addition to the preliminary stage, and with two liquid eliminator stages 31d, 31e.

By employing only the upper of the liquid inlets 46a, the stage 31d may be converted to a washing stage. By employing both of the liquid inlets 46 and 46a in the form shown, the washed gases entering the stage 31d may be subjected to a final wash with a relatively small quantity of clean water, which, descending through the tube 39, will not be entrained and returned to as great an extent as the larger volume of water used in the underlying washing stages. In this arrangement, also, the eliminator portion of the separator comprises dished partition elements 42, 42a, simplifying the construction. As before, window elements or access panels may be provided, as indicated at 54.

Due to the subdividing and multiple impingement operation in dust separators according to the present invention, highly effective separation is obtained with relatively low fan power and consumption of relatively small quantities of water. The particles of material carried by the air stream are recovered at one liquid draw-off point, namely, the sludge outlet 4, Fig. 1, or 34, Fig. 19, which may be piped directly to the sewer or other place of disposal.

From the foregoing description it will be apparent that the specific embodiments disclosed herein are illustrative and not restrictive of the invention, the scope of the invention being defined in the appended claims. All modifications which come within the meaning and range of equivalency of the claims are therefore intended to be included therein.

I claim as my invention:

1. A wet dust collector comprising an elongated generally vertically disposed casing, a gas uptake duct extending vertically within said casing and having an outwardly flanged top edge fastened to the casing and separating said casing into vertically spaced sections connected by said duct, said uptake duct also having a smaller outwardly flanged bottom edge to assist in guiding upwardly flowing gas into said duct, a cap above said uptake duct and spaced therefrom, said cap having a cone-shaped top surface and a flat horizontal bottom surface, an assembly of flat-walled gas-rotation-inhibiting vanes under said cap and inside said duct and forming therein a multiplicity of narrow passages extending vertically upwards in said duct and laterally under said cap to present a large amount of wall surface to dust-laden gas rising in said duct through said multiplicity of passageways and transversely deflected by the flat bottom of said cap, and supply structure connected to said casing for wetting the interior thereof including the wall surfaces of said multiplicity of passages to increase the collection of dust from the dust-laden gas.

2. The combination as defined in claim 1 in which said vertical casing includes a tangential gas inlet below said duct to swirl the incoming gases for improving the separation of the larger dust particles suspended in said gas before passage to the duct, and to improve the impingement of the swirling gas against the walls of the passageways.

3. In a wet dust collector for mechanically trapping particles suspended in a stream of gas, a linear gas flow vane assembly comprising: a gas duct; a multiplicity of flat-surfaced sheet metal vanes supported by said duct with their flat surfaces disposed longitudinally of the duct and extending out from one end thereof, said vanes being spaced one from the other to form between them a corresponding multiplicity of flat-walled gas passageways communicating with, extending laterally with respect to, and opening around substantially the entire perimeter of the duct; and a cap having a flat surface closing off the longitudinal ends of said passageways between said vanes to deflect gas in said passageways laterally outward around said cap over substantially the entire perimeter of said duct.

4. The combination as defined by claim 3 in which the vanes include a number of groups positioned radially symmetrically of said duct, the individual vanes of said groups being V-shaped in plan view and each group having a succession of similar V-shaped vanes supported with their respective arms of the V directed outwardly in parallel and equally spaced relation to form a number of flat-walled gas passageways opening on the perimeter of said duct.

5. The combination as defined in claim 3 in which the vanes are in the form of flat sheets arranged in two immediately adjacent longitudinally displaced levels in said duct, the vanes in each level separately dividing the cross section of said duct into a multiplicity of parallel passageways each extending transversely across said duct; and the passageways at one level of said vanes running at right angles to the passageways of the other level.

6. The combination as defined by claim 3 in which the portions of the vanes extending out of the duct project beyond the perimeter of said duct and are offset in plan view to impart some swirling motion to gas emerging from under the cap.

7. The combination as defined in claim 3 in which the vanes are arranged in two immediately adjacent longitudinally displaced levels in said duct, with the inner level of said vanes in the form of a grillwork dividing the cross section of said duct into a multiplicity of vertically extending, parallel passageways and the outer level of said vanes including a number of groups positioned radially symmetrically in said duct, the individual vanes of said groups being V-shaped in plan view and each group having a succession of similar V-shaped vanes supported with their respective arms of the V directed outwardly in parallel and equally spaced relation to form a number of flat-walled gas passageways opening on the perimeter of said duct.

8. The combination as defined by claim 3 in which said gas duct is outwardly flanged along its edge to form means for supporting said duct within the dust collector while deflecting the flow of a dust-collecting liquid into the duct.

9. The combination as defined by claim 3 in which said gas duct is outwardly flanged along its edge to form means for supporting said duct within the dust collector, and the flange is perforated to pass dust-collecting liquid through the casing around the duct.

10. The combination as defined in claim 3 in which the cap has a cone shaped top surface for outwardly deflecting a stream of dust-collecting liquid through the stream of gas being outwardly deflected by the flat surface of said cap.

11. In a wet dust collector having vanes for mechanically trapping particles suspended in a stream of gas contacting said vanes, a linear gas flow vane assembly comprising: a gas uptake duct; a multiplicity of flat surfaced sheet metal vanes supported in vertical positions in said duct and extending up from the top thereof, said vanes being spaced one from the other to form between them a corresponding multiplicity of flat-walled gas passageways communicating with, extending laterally with respect to, and opening around substantially the entire perimeter of said duct; a vane supporting framework adjustably mounted in said duct to support said multiplicity of vanes in aligned relation as a single unit and to form means for adjusting the vertical position of said vanes in said duct; and a cap having a flat horizontal surface closing off the tops of said passageways between said vanes to deflect gas rising vertically in said passageways laterally outward from under said cap through said passageways opening about substantially the entire perimeter of said duct.

WALTER O. VEDDER.

REFERENCES CITED

The following references are of record in the file of this patent:

UNITED STATES PATENTS

| Number | Name | Date |
|---|---|---|
| 2,259,033 | Fisher | Oct. 14, 1941 |
| 2,392,705 | Smith et al. | Jan. 8, 1946 |
| 2,409,088 | Weits et al. | Oct. 8, 1946 |